US012619446B2

(12) United States Patent　(10) Patent No.:　US 12,619,446 B2
Messick et al.　(45) Date of Patent:　May 5, 2026

(54) SYSTEMS AND METHODS TO IDENTIFY PEER NODES IN A MULTI-NODE ENCLOSURE

(71) Applicant: Dell Products L.P., Round Rock, TX (US)

(72) Inventors: Douglas E. Messick, Austin, TX (US); Kyle E. Cross, Austin, TX (US); Binay A. Kuruvila, Cedar Park, TX (US); Thomas Foxworth Archer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 77 days.

(21) Appl. No.: 18/422,019

(22) Filed: Jan. 25, 2024

(65) Prior Publication Data

US 2025/0245021 A1　Jul. 31, 2025

(51) Int. Cl.
G06F 9/44　(2018.01)
G06F 9/445　(2018.01)
(52) U.S. Cl.
CPC ............................... G06F 9/44505 (2013.01)

(58) Field of Classification Search
CPC ..................................... G06F 1/32; G06F 9/44
See application file for complete search history.

(56) References Cited

U.S. PATENT DOCUMENTS

2018/0219726 A1* 8/2018 Wang .................. H04L 41/0895
2024/0330070 A1* 10/2024 Cudak ................... G06F 9/5027

* cited by examiner

*Primary Examiner* — Keshab R Pandey
(74) *Attorney, Agent, or Firm* — Fogarty LLP

(57) ABSTRACT

Systems and methods to identify peer nodes in a multi-node enclosure are described. In an illustrative, non-limiting embodiment, an Information Handling System (IHS) may include: a baseboard management controller (BMC) or a Datacenter-Secure Control Module (DC-SCM); and a memory coupled to or integrated with the BMC or DC-SCM, where the memory includes program instructions stored thereon that, upon execution by the BMC or DC-SCM, cause the IHS to: obtain configuration information associated with a first compute node of a multi-node enclosure; write the configuration information associated with the first compute node to a shared storage device that is accessible to other compute nodes of the multi-node enclosure; and obtain other configuration information associated with one or more other compute nodes of the multi-node enclosure from the shared storage device.

17 Claims, 8 Drawing Sheets

200

BASEBOARD MANAGEMENT CONTROLLER (BMC) IDENTIFICATION OF PEER NODES WORKFLOW:

210 — BMC BOOT, REBOOT, AC CYCLE, ETC

220 — BMC DETECTION OF LOCATION IDENTIFIER IN A MULTI-NODE ENCLOSURE [1...n]

230 — BMC WRITES NODE DATA (SUCH AS SERVICE TAG) INTO THE POWER DISTRIBUTION BOARD (PDB) EEPROM's SPECIFIED LOCATION. HOST PROCESSOR MODULE 1 (HPM[1]) WRITES THE $1^{ST}$ KB OF MEMORY, HPM[2] THE $2^{ND}$ KB,... HPM[n] HAS THE $N^{TH}$ KB

240 — ALL BMCs IN THE ENCLOSURE WILL READ NODE IDENTIFICATION DATA IN THE MEMORY LOCATIONS WRITTEN BY PEER NODES

250 — ALL BMCs STORE THE INFORMATION ABOUT PEER NODES AND MAKE IT AVAILABLE FOR LOGS AND ALL OTHER USE CASES

260 — A PERIODIC DISCOVERY AND/OR RETRY LOOP IS INITIATED BY ALL BMCs TO IDENTIFY AND KEEP UP WITH ANY CONFIG CHANGES

200

BASEBOARD MANAGEMENT CONTROLLER (BMC)
IDENTIFICATION OF PEER NODES WORKFLOW:

210

BMC BOOT, REBOOT, AC CYCLE, ETC

220

BMC DETECTION OF LOCATION IDENTIFIER IN A MULTI-NODE ENCLOSURE [1...n]

230

BMC WRITES NODE DATA(SUCH AS SERVICE TAG) INTO THE POWER DISTRIBUTION BOARD
(PDB) EEPROM's SPECIFIED LOCATION. HOST PROCESSOR MODULE 1 (HPM[1]) WRITES
THE $1^{ST}$ KB OF MEMORY, HPM[2] THE $2^{ND}$ KB,... HPM[n] HAS THE $N^{TH}$ KB

240

ALL BMCs IN THE ENCLOSURE WILL READ NODE IDENTIFICATION DATA IN THE MEMORY
LOCATIONS WRITTEN BY PEER NODES

250

ALL BMCs STORE THE INFORMATION ABOUT PEER NODES AND MAKE IT AVAILABLE FOR LOGS
AND ALL OTHER USE CASES

260

A PERIODIC DISCOVERY AND/OR RETRY LOOP IS INITIATED BY ALL BMCs TO IDENTIFY AND
KEEP UP WITH ANY CONFIG CHANGES

310 — BMC POWERS UP

320 — BMC DISCOVERS ITS LOCATION AND CREATES UNIQUE IDENTIFIER

330 — BMC ACCESSES SHARED STORAGE DEVICE TO WRITE ITS LOCATION AND BASIC INFO AND READS INFO FOR OTHER BMCs

340 — BMC PERIODICALLY CHECKS FOR NEW INFO

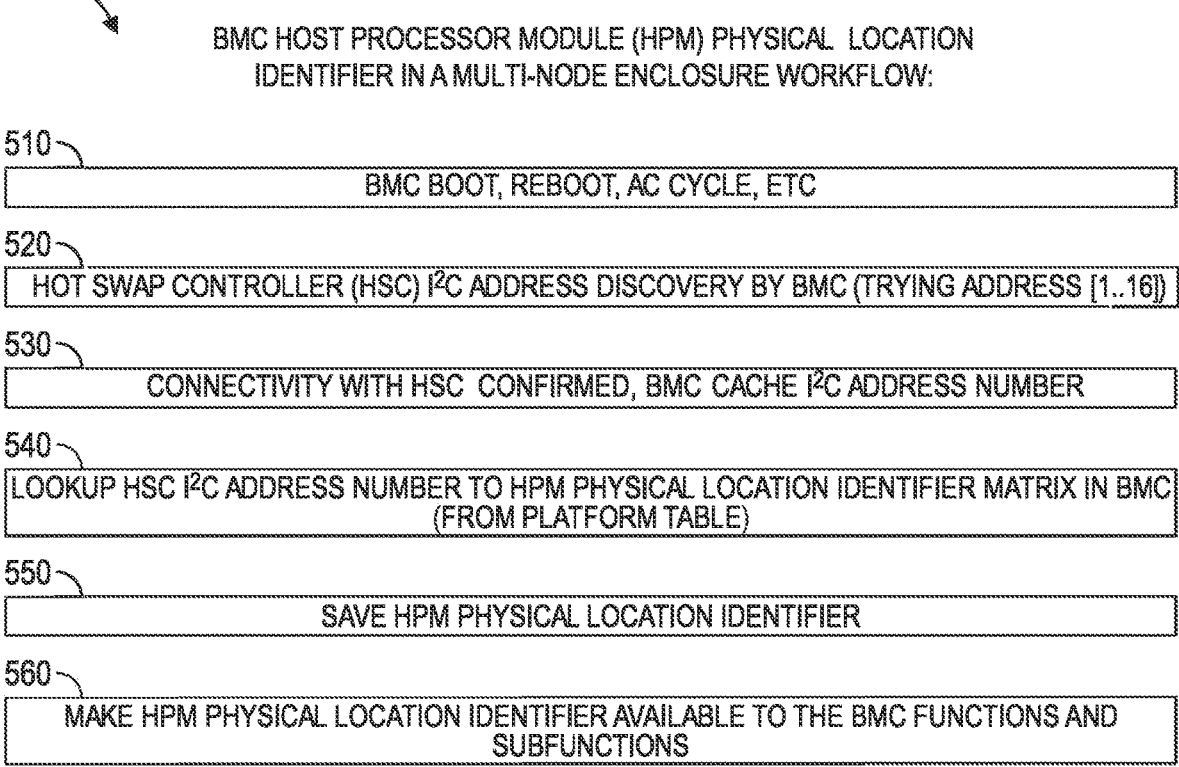

500

BMC HOST PROCESSOR MODULE (HPM) PHYSICAL LOCATION
IDENTIFIER IN A MULTI-NODE ENCLOSURE WORKFLOW:

510
BMC BOOT, REBOOT, AC CYCLE, ETC

520
HOT SWAP CONTROLLER (HSC) I2C ADDRESS DISCOVERY BY BMC (TRYING ADDRESS [1..16])

530
CONNECTIVITY WITH HSC CONFIRMED, BMC CACHE I2C ADDRESS NUMBER

540
LOOKUP HSC I2C ADDRESS NUMBER TO HPM PHYSICAL LOCATION IDENTIFIER MATRIX IN BMC
(FROM PLATFORM TABLE)

550
SAVE HPM PHYSICAL LOCATION IDENTIFIER

560
MAKE HPM PHYSICAL LOCATION IDENTIFIER AVAILABLE TO THE BMC FUNCTIONS AND
SUBFUNCTIONS

610  BMC POWERS UP

620  BMC POLLS HSC I²C ADDRESSES

630  ONCE AN ADDRESS IS ACKNOWLEDGED, BMC CROSS REFERENCES LOOKUP TABLE TO TRANSLATE I²C ADDRESS TO PHYSICAL LOCATION

640  BMC CAN NOW STORE PHYSICAL LOCATION AND MAKE IT AVAILABLE TO INTERNAL AND EXTERNAL FUNCTIONS

SYSTEMS AND METHODS TO IDENTIFY PEER NODES IN A MULTI-NODE ENCLOSURE

FIELD

This disclosure relates generally to Information Handling Systems (IHSs), and more specifically, to systems and methods to identify peer nodes in a multi-node enclosure.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

Groups of IHSs can be housed in server racks of data centers. A data center is a building, a dedicated space within a building, or a group of buildings used to house computer systems and associated components, such as telecommunications and storage systems. Since IT operations are crucial for business continuity, it generally includes redundant or backup components and infrastructure for power supply, data communication connections, environmental controls (e.g., air conditioning, fire suppression), and various security devices. A large data center is an industrial-scale operation using as much electricity as a small town. A server rack, or simply "rack", is a frame or enclosure, with one or more dimensions typically standardized, for mounting multiple electronic equipment modules. Each module has a front panel that typically has a standardized width, which sometimes is 19 inches wide, for example. The standardized width (e.g., 19-inches) dimension includes the edges or ears that protrude from each side of the equipment, allowing the module to be fastened to the rack frame with screws or bolts. Common uses include computer servers, telecommunications equipment and networking hardware, audiovisual production gear, music production equipment, and scientific equipment.

Equipment designed to be placed in a rack is typically described as rack-mount, rack-mount instrument, a rack-mounted system, a rack-mount chassis, subrack, rack cabinet, rack-mountable, or occasionally simply shelf. Each rack-mountable equipment module has a front panel that is typically a standardized width, (e.g., 19 inches wide). The standardized width can include the edges or ears that protrude from each side of the equipment, allowing the module to be fastened to the rack frame with screws or bolts. The height of the electronic modules is also typically standardized as multiples of 1.75 inches, which is one rack unit ("RU" or more typically just "U"). The industry-standard rack cabinet is 42 RU tall, however, 45 RU racks are also common.

Racks (e.g., nineteen-inch racks) in two-post or four-post form hold most equipment in modern data centers, ISP facilities, and professionally designed corporate server rooms. They allow for dense hardware configurations without occupying excessive floor space or requiring shelving. Racks can also be used to house professional audio and video equipment, including amplifiers, effects units, interfaces, headphone amplifiers, and even small-scale audio mixers. A third common use for rack-mounted equipment is industrial power, control, and automation hardware.

Rack-mountable equipment can be mounted by bolting or clipping its front panel to the server rack. Within the IT industry, it is common for network/communications equipment to have multiple mounting positions, including table-top and wall mounting, so rack-mountable equipment will often feature L-brackets that must be screwed or bolted to the equipment prior to mounting in a server rack, such as for example, a 19-inch rack.

SUMMARY

Systems and methods to identify peer nodes in a multi-node enclosure are described. In an illustrative, non-limiting embodiment, an Information Handling System (IHS) may include: a baseboard management controller (BMC) or a Datacenter-Secure Control Module (DC-SCM); and a memory coupled to or integrated with the BMC or DC-SCM, where the memory includes program instructions stored thereon that, upon execution by the BMC or DC-SCM, cause the IHS to: obtain configuration information associated with a first compute node of a multi-node enclosure; write the configuration information associated with the first compute node to a shared storage device that is accessible to other compute nodes of the multi-node enclosure; and obtain other configuration information associated with one or more other compute nodes of the multi-node enclosure from the shared storage device.

In some embodiments, the program instructions further cause the IHS to: identify a location of the first compute node within the multi-node enclosure; where to write the configuration information associated with the first compute node to the shared storage device, the program instructions further cause the IHS to: determine a memory location of the shared storage device based, at least in part, on the identified location of the first compute node; and write the configuration information associated with the first compute node to the shared storage device at the determined memory location. In some embodiments, each node of the multi-node enclosure writes configuration information to a different memory location of the shared storage device.

In some embodiments, to identify the location of the first compute node within a multi-node enclosure, the program instructions further cause the IHS to: obtain a bus address of a first hot swap controller (HSC) associated with the first compute node; and determine a physical location identifier of the first compute node based, at least in part, on the bus address of the first HSC. In some embodiments, the bus address is an address of an Inter-Integrated Circuit (I2C) bus.

In some embodiments, to determine the physical location identifier of the first compute node, the program instructions further cause the IHS to: use a pre-programmed table or map to match the bus address of the first HSC to the physical location identifier of the first compute node.

In some embodiments, the shared storage device is located on a power distribution board (PDB) of the multi-node enclosure. In some embodiments, the configuration information associated with the first compute node is written to the shared storage device via an Inter-Integrated Circuit (I2C) bus between the PDB and the BMC or DC-SCM. In some embodiments, the PDB further includes a service indicator component, where the program instructions further cause the IHS to: determine that the first compute node requires service; identify a location of the first compute node within the multi-node enclosure; and provide to the service indicator component of the PDB the location of the first compute node. In some embodiments, the service indicator includes at least one of: an e-reader, an LED indicator, an electro-mechanical motor, or an unpowered RFID reader.

In some embodiments, the BMC or DC-SCM is associated with the first compute node. In some embodiments, the shared storage device is an electrically crasable programmable read-only memory (EEPROM). In some embodiments, a first host processor module (HPM) includes the first compute node, where the configuration information includes at least one of: the physical location of the first HPM, a serial number of the HPM, a serial number of the BMC or DC-SCM, a unique identifier of the HPM, a unique identifier of the BMC or DC-SCM, a model number of the HPM, a model number of the BMC or DC-SCM, a service tag of the HPM, or a service tag of the BMC or DC-SCM. In some embodiments, the program instructions further cause the IHS to: periodically access the shared storage device to check for updates to the other configuration information.

In another illustrative, non-limiting embodiment, one or more non-transitory computer-readable storage media store program instructions that when executed on or across one or more processors of an Information Handling System (IHS), cause the one or more processors to: obtain configuration information associated with a first compute node of a multi-node enclosure; write the configuration information associated with the first compute node to a shared storage device that is accessible to other compute nodes of the multi-node enclosure; and obtain other configuration information associated with one or more other compute nodes of the multi-node enclosure from the shared storage device.

In some embodiments, the program instructions further cause the one or more processors to: identify a location of the first compute node within the multi-node enclosure; where to write the configuration information associated with the first compute node to the shared storage device, the program instructions further cause the one or more processors to: determine a memory location of the shared storage device based, at least in part, on the identified location of the first compute node; and write the configuration information associated with the first compute node to the shared storage device at the determined memory location.

In some embodiments, to identify the location of the first compute node within a multi-node enclosure, the program instructions further cause the one or more processors to: obtain a bus address of a first hot swap controller (HSC) associated with the first compute node; and determine a physical location identifier of the first compute node based, at least in part, on the bus address of the first HSC.

In another illustrative, non-limiting embodiment, a method includes: obtaining, by a baseboard management controller (BMC) or a Datacenter-Secure Control Module (DC-SCM) of a first compute node of a multi-node enclosure, configuration information associated with the first compute node; writing, by the BMC or DC-SCM, the configuration information associated with the first compute node to a shared storage device that is accessible to other compute nodes of the multi-node enclosure; and obtaining, by the BMC or DC-SCM, other configuration information associated with one or more other compute nodes of the multi-node enclosure from the shared storage device.

In some embodiments, the method further includes: identifying, by the BMC or DC-SCM, a location of the first compute node within the multi-node enclosure; where writing the configuration information associated with the first compute node to the shared storage device further includes: determining, by the BMC or DC-SCM, a memory location of the shared storage device based, at least in part, on the identified location of the first compute node; and writing, by the BMC or DC-SCM, the configuration information associated with the first compute node to the shared storage device at the determined memory location.

In some embodiments, identifying the location of the first compute node within a multi-node enclosure further includes: obtaining, by the BMC or DC-SCM, a bus address of a first hot swap controller (HSC) associated with the first compute node; and determining, by the BMC or DC-SCM, a physical location identifier of the first compute node based, at least in part, on the bus address of the first HSC.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 2 depicts a workflow illustrating an example method to identify peer nodes in a multi-node enclosure by a Baseboard Management Controller (BMC), according to some embodiments.

FIG. 5 depicts a workflow illustrating an example method for the BMC of a node in a multi-node enclosure to identify the physical location of the node, according to some embodiments.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may consist of various combinations of a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include components such as Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
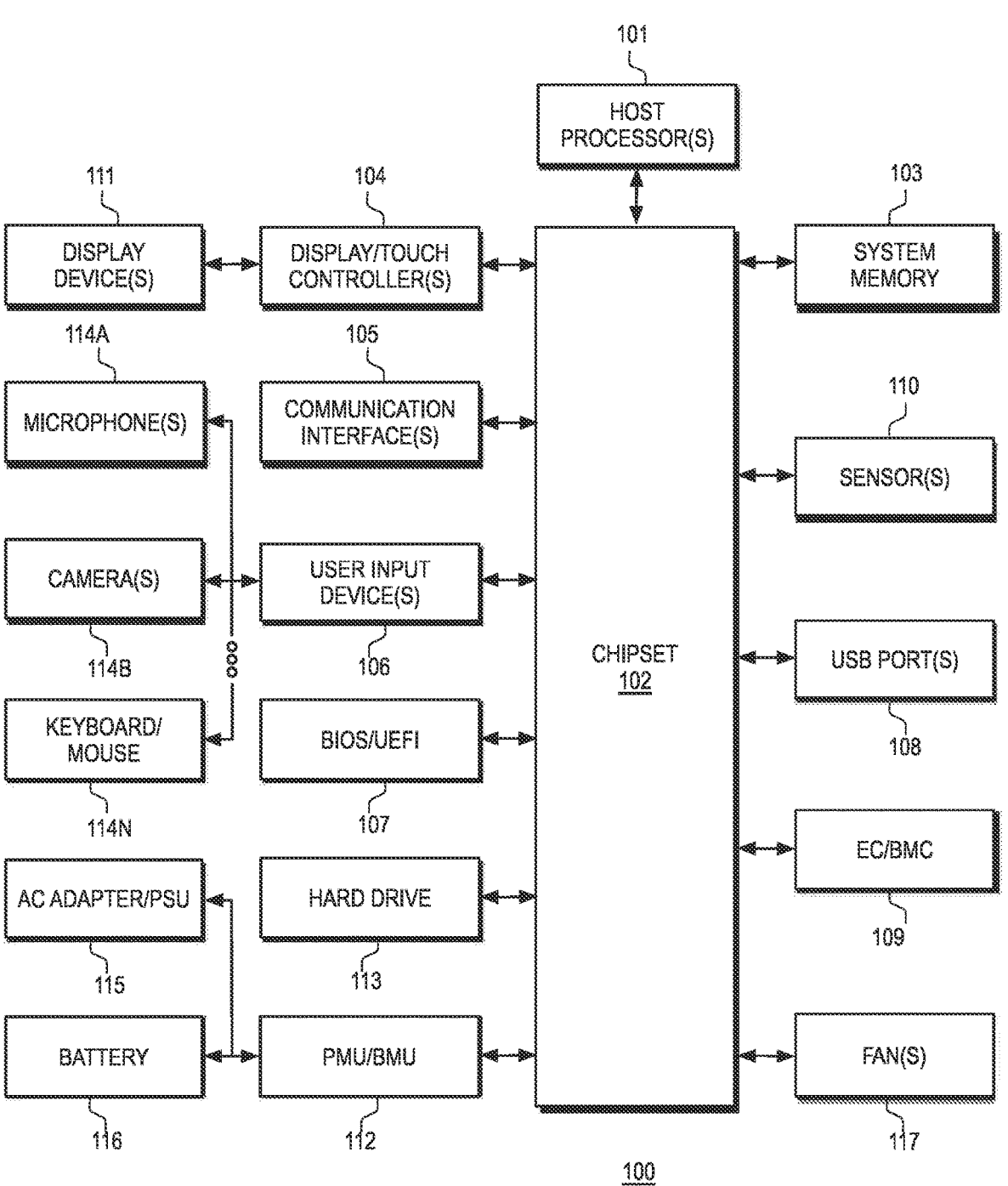
FIG. 1 is a diagram illustrating examples of hardware components of an Information Handling System (IHS), according to some embodiments.

FIG. 1 is a block diagram of hardware components of IHS 100, which may be used to implement systems and methods to identify peer nodes in a multi-node enclosure.

As depicted, IHS 100 includes host processor(s) 101. In various embodiments, IHS 100 may be a single-processor system, or a multi-processor system including two or more processors. Host processor(s) 101 may include any processor capable of executing program instructions, such as a PENTIUM processor, or any general-purpose or embedded processor implementing any of a variety of Instruction Set Architectures (ISAs), such as an x86 or a Reduced Instruction Set Computer (RISC) ISA (e.g., POWERPC, ARM, SPARC, MIPS, etc.). In some embodiments, the host processor(s) 101 can include memory built into the host processor(s) from which, for example, program instructions can be executed.

IHS 100 includes chipset 102 coupled to host processor(s) 101. Chipset 102 may provide host processor(s) 101 with access to several resources. In some cases, chipset 102 may utilize a QuickPath Interconnect (QPI) bus to communicate with host processor(s) 101.

Chipset 102 may also be coupled to communication interface(s) 105 to enable communications between IHS 100 and various wired and/or wireless networks, such as Ethernet, WiFi, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like. Communication interface(s) 105 may also be used to communicate with certain peripherals devices (e.g., BT speakers, microphones, headsets, etc.). Moreover, communication interface(s) 105 may be coupled to chipset 102 via a Peripheral Component Interconnect Express (PCIe) bus, or the like.

Chipset 102 may be coupled to display/touch controller(s) 104, which may include one or more or Graphics Processor Units (GPUs) on a graphics bus, such as an Accelerated Graphics Port (AGP) or PCIe bus. As shown, display/touch controller(s) 104 provide video or display signals to one or more display device(s) 111.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc. In some cases, display device(s) 111 may be provided as a single continuous display, or as two or more discrete displays.

Chipset 102 may provide host processor(s) 101 and/or display/touch controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like.

Chipset 102 may also provide host processor(s) 101 with access to one or more Universal Serial Bus (USB) ports 108, to which one or more peripheral devices may be coupled (e.g., integrated or external webcams, microphones, speakers, etc.).

Chipset 102 may further provide host processor(s) 101 with access to one or more hard disk drives, solid-state drives, optical drives, or other removable-media drives 113.

Chipset 102 may also provide access to one or more user input devices 106, for example, using a super I/O controller or the like. Examples of user input devices 106 include, but are not limited to, microphone(s) 114A, camera(s) 114B, and keyboard/mouse 114N. Other user input devices 106 may include a touchpad, stylus or active pen, totem, etc.

Each of user input devices 106 may include a respective controller (e.g., a touchpad may have its own touchpad controller) that interfaces with chipset 102 through a wired or wireless connection (e.g., via communication interfaces(s) 105). In some cases, chipset 102 may also provide access to one or more user output devices (e.g., video projectors, paper printers, 3D printers, loudspeakers, audio headsets, Virtual/Augmented Reality (VR/AR) devices, etc.)

In certain embodiments, chipset 102 may further provide an interface for communications with hardware sensors 110.

Sensors 110 may be disposed on or within the chassis of IHS 100, or otherwise coupled to IHS 100, and may include, but are not limited to: electric, magnetic, radio, optical (e.g., camera, webcam, etc.), infrared, thermal (e.g., thermistors etc.), force, pressure, acoustic (e.g., microphone), ultrasonic, proximity, position, deformation, bending, direction, movement, velocity, rotation, gyroscope, Inertial Measurement Unit (IMU), and/or acceleration sensor(s).

Upon booting of IHS 100, host processor(s) 101 may utilize program instructions of Basic Input/Output System (BIOS) 107 to initialize and test hardware components coupled to IHS 100 and to load host OS 400 (FIG. 4) for use by IHS 100. BIOS 107 provides an abstraction layer that allows host OS 400 to interface with certain IHS components 100. Relying upon the hardware abstraction layer provided by BIOS 107, software stored in system memory 103 and executed by host processor(s) 101 can interface with certain I/O devices that are coupled to IHS 100.

The Unified Extensible Firmware Interface (UEFI) was designed as a successor to BIOS. As a result, many modern IHSs utilize UEFI in addition to or instead of a BIOS. As used herein, BIOS 107 is intended to also encompass a UEFI component.

Embedded Controller (EC) or Baseboard Management Controller (BMC) 109 is operational from the very start of each IHS power reset and handles various tasks not ordinarily handled by host processor(s) 101. Examples of these operations may include, but are not limited to: receiving and processing signals from a keyboard or touchpad, as well as other buttons and switches (e.g., power button, laptop lid switch, etc.), receiving and processing thermal measurements (e.g., performing fan control, CPU and GPU throttling, and emergency shutdown), controlling indicator LEDs (e.g., caps lock, scroll lock, num lock, battery, ac, power, wireless LAN, sleep, etc.), managing PMU/BMU 112, alternating current (AC) adapter/Power Supply Unit (PSU) 115 and/or battery 116, allowing remote diagnostics and remediation over network(s) 103, etc.

For example, EC/BMC 109 may implement operations for interfacing with power adapter/PSU 115 in managing power for IHS 100. Such operations may be performed to determine the power status of IHS 100, such as whether IHS 100 is operating from AC adapter/PSU 115 and/or battery 116. A non-limiting example of a BMC 109 is the integrated Dell Remote Access Controller (iDRAC) from Dell, Inc.®.

Firmware instructions utilized by EC/BMC 109 may also be used to provide various core operations of IHS 100, such as power management and management of certain modes of IHS 100 (e.g., turbo modes, maximum operating clock frequencies of certain components, etc.).

In addition, EC/BMC 109 may implement operations for detecting certain changes to the physical configuration or posture of IHS 100. For instance, when IHS 100 as a 2-in-1 laptop/tablet form factor, EC/BMC 109 may receive inputs from a lid position or hinge angle sensor 110, and it may use those inputs to determine: whether the two sides of IHS 100 have been latched together to a closed position or a tablet position, the magnitude of a hinge or lid angle, etc. In response to these changes, the EC may enable or disable certain features of IHS 100 (e.g., front or rear facing camera, etc.).

In some cases, EC/BMC 109 may be configured to identify any number of IHS postures, including, but not limited to: laptop, stand, tablet, tent, or book. For example, when display(s) 111 of IHS 100 is open with respect to a horizontal keyboard portion, and the keyboard is facing up, EC/BMC 109 may determine IHS 100 to be in a laptop posture. When display(s) 111 of IHS 100 is open with respect to the horizontal keyboard portion, but the keyboard is facing down (e.g., its keys are against the top surface of a table), EC/BMC 109 may determine IHS 100 to be in a stand posture.

When the back of display(s) 111 is closed against the back of the keyboard portion, EC/BMC 109 may determine IHS 100 to be in a tablet posture. When IHS 100 has two display(s) 111 open side-by-side, EC/BMC 109 may determine IHS 100 to be in a book posture. When IHS 100 has two displays open to form a triangular structure sitting on a horizontal surface, such that a hinge between the displays is at the top vertex of the triangle, EC/BMC 109 may determine IHS 100 to be in a tent posture. In some implementations, EC/BMC 109 may also determine if display(s) 111 of IHS 100 are in a landscape or portrait orientation.

In some cases, EC/BMC 109 may be installed as a Trusted Execution Environment (TEE) component to the motherboard of IHS 100.

Additionally, or alternatively, EC/BMC 109 may be configured to calculate hashes or signatures that uniquely identify individual components of IHS 100. In such scenarios, EC/BMC 109 may calculate a hash value based on the configuration of a hardware and/or software component coupled to IHS 100. For instance, EC/BMC 109 may calculate a hash value based on all firmware and other code or settings stored in an onboard memory of a hardware component.

Hash values may be calculated as part of a trusted process of manufacturing IHS 100 and may be maintained in secure storage as a reference signature. EC/BMC 109 may later recalculate the hash value for a component may compare it against the reference hash value to determine if any modifications have been made to the component, thus indicating that the component has been compromised. In this manner, EC/BMC 109 may validate the integrity of hardware and software components installed in IHS 100.

In various embodiments, IHS 100 may be coupled to an external power source (e.g., AC outlet or mains) through AC adapter/PSU 115. AC adapter/PSU 115 may include an adapter portion having a central unit (e.g., a power brick, wall charger, or the like) configured to draw power from an AC outlet via a first electrical cord, convert the AC power to direct current (DC) power, and provide DC power to IHS 100 via a second electrical cord.

Additionally, or alternatively, AC adapter/PSU 115 may include an internal or external power supply portion (e.g., a switching power supply, etc.) connected to the second electrical cord and configured to convert AC to DC. AC adapter/PSU 115 may also supply a standby voltage, so that most of IHS 100 can be powered off after preparing for hibernation or shutdown, and powered back on by an event (e.g., remotely via wake-on-LAN, etc.). In general, AC adapter/PSU 115 may have any specific power rating, measured in volts or watts, and any suitable connectors.

IHS 100 may also include internal or external battery 116. Battery 116 may include, for example, a Lithium-ion or Li-ion rechargeable device capable of storing energy sufficient to power IHS 100 for an amount of time, depending upon the IHS's workloads, environmental conditions, etc. In some cases, a battery pack may also contain temperature sensors, voltage regulator circuits, voltage taps, and/or charge-state monitors.

Power Management Unit (PMU) 112 governs power functions of IHS 100, including AC adapter/PSU 115 and battery 116. For example, PMU 112 may be configured to: monitor power connections and battery charges, charge battery 116, control power to other components, devices, or ICs, shut down components when they are left idle, control sleep and power functions ("on" and "off"), manage interfaces for built-in keypad and touchpads, regulate real-time clocks (RTCs), etc.

In some implementations, PMU 112 may include one or more Power Management Integrated Circuits (PMICs) configured to control the flow and direction or electrical power in IHS 100. Particularly, a PMIC may be configured to perform battery management, power source selection, voltage regulation, voltage supervision, undervoltage protection, power sequencing, and/or charging operations. It may also include a DC-to-DC converter to allow dynamic voltage scaling, or the like.

Additionally, or alternatively, PMU 112 may include a Battery Management Unit (BMU) (referred to collectively as "PMU/BMU 112"). AC adapter/PSU 115 may be removably coupled to a battery charge controller within PMU/BMU 112 to provide IHS 100 with a source of DC power from battery cells within battery 116 (e.g., a lithium ion (Li-ion) or nickel metal hydride (NiMH) battery pack including one or more rechargeable batteries). PMU/BMU 112 may include non-volatile memory and it may be configured to collect and store battery status, charging, and discharging information, and to provide that information to other IHS components.

Examples of information collected and stored in a memory within PMU/BMU 112 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information (e.g., such as ambient temperature, relative humidity, system geolocation measured by GPS or triangulation, time and date, etc.), and BMU events.

Examples of BMU events may include, but are not limited to: acceleration or shock events, system transportation events, exposure to elevated temperature for extended time periods, high discharge current rate, combinations of battery voltage, battery current and/or battery temperature (e.g., elevated temperature event at full charge and/or high voltage causes more battery degradation than lower voltage), etc.

In some embodiments, power draw measurements may be conducted with control and monitoring of power supply via PMU/BMU 112. Power draw data may also be monitored with respect to individual components or devices of IHS 100. Whenever applicable, PMU/BMU 112 may administer the execution of a power policy, or the like.

IHS 100 may also include one or more fans 117 configured to cool down one or more components or devices of IHS 100 disposed inside a chassis, case, or housing. Fan(s) 117 may include any fan inside, or attached to, IHS 100 and used for active cooling. Fan(s) 117 may be used to draw cooler air into the case from the outside, expel warm air from inside, and/or move air across a heat sink to cool a particular IHS component. In various embodiments, both axial and sometimes centrifugal (blower/squirrel-cage) fans may be used.

In other embodiments, IHS 100 may not include all the components shown in FIG. 1. In other embodiments, IHS 100 may include other components in addition to those that are shown in FIG. 1. For example, IHS 100 may include security processors (e.g., Trusted Platform Module (TPM)), GPUs, and/or AI accelerators.

Furthermore, some components that are represented as separate components in FIG. 1 may instead be integrated with other components, such that all or a portion of the operations executed by the illustrated components may instead be executed by the integrated component.

For example, in various embodiments described herein, host processor(s) 101 and/or other components of IHS 100 (e.g., chipset 102, display/touch controller(s) 104, communication interface(s) 105, EC/BMC 109, etc.) may be replaced by discrete devices within a heterogenous computing platform (e.g., a System-On-Chip or "SoC"). As such, IHS 100 may assume different form factors including, but not limited to: servers, workstations, desktops, laptops, appliances, video game consoles, tablets, smartphones, etc.

Typically, an IHS, such as a server, is going to have AC power coming into its power supplies. With servers, there's usually more than one power supply. With a normal runtime, everything's healthy and a server is within its power bounds. A server is loaded and is consuming the power. With a failure scenario, a power supply might go down and so the power source is reduced, or something on the server is overheating, and the power consumption of the device needs to be reduced. Therefore, sometimes power to devices needs to be controlled because of external power delivery issues. Power of the device needs to be controlled because of internal reasons, independent of the power capability that is being supplied.

Typically, an EC/BMC can perform the power control. For example, EC/BMC 109 may implement operations for interfacing with power adapter/PSU 115 in managing power for IHS 100. In a server rack environment, the EC/BMC in each node manages the PSUs and implements redundancy and power control behaviors to respond to PSU failures and implement PSU hardware protection.

In other embodiments, modular server architectures give cloud service providers a variety of compute choices to meet market and business conditions, offer flexible configurations, and deliver innovative solutions. The Datacenter-Modular Hardware System ("DC-MHS"), which may be considered to form at least part of an IHS, provides interoperability between datacenter, edge, and enterprise infrastructure using consistent interfaces and modular building blocks. DC-MHS standardizes various Host Processor Module ("HPM") form factors and provides supporting elements for interoperability of HPMs across various platforms. The HPM is managed by a Datacenter-Secure Control Module ("DC-SCM"), which is designed to enable a common management and security infrastructure across platforms within a data center. The HPM of a DC-MHS is a traditional CPU-memory device with the Baseboard Management Controllers ("BMCs") and security functions moved to the DC-SCM. HPMs are not limited to a standard processor architecture and can apply any processor architecture utilizing management and security features.

Typically, a single rack-mountable equipment module contains a single compute node. A compute node is a single IHS, that includes one or more processors, and that typically runs its own instance of an operating system. A compute node can also include its own storage, networking, and memory resources. A single rack-mountable equipment module that contains a single compute node can be called a single-node enclosure. As an example with single-node enclosures, if a server rack contained 50 nodes, and each node had two power supplies, then there would be 100 power supplies inside each of the racks, with the EC/BMC (or DC-SCM) of each of the servers monitoring their own two power supplies. If one of the power supplies in a traditional server is lost, then the EC/BMC needs to control power so that the limits of that one power supply are not exceeded.

Every compute node can have a location attribute. The node's location information depends on the server type. For rack servers, the node's location information can include which rack the node is in, the height of the node (e.g., in RUs), and/or the node's position in the rack. For blade servers for example, the node's location information can depend on which rack and/or chassis the node is in.

However, instead of single-node enclosures, some architectures have multiple nodes or HPMs or Motherboards in a single rack-mountable equipment module. Such architectures can be called a multi-node enclosure. A multi-node enclosure usually does not have a standalone Chassis Manager (CM) or Enclosure Controller (EC). Therefore, enabling the BMC (or DC-SCM) to know the physical location of the node(s) it is managing within the multi-node enclosure would be useful information for serviceability and future use cases. Prior to servicing a node in a single-node enclosure, the workload should be migrated or otherwise managed. Likewise, in a multi-node enclosure, the workloads for all nodes need to be managed prior to service, because the nodes lose their connection to power and cooling infrastructure when the enclosure is serviced.

A Power Distribution Board (PDB) of a server (e.g., where the server is in a server rack) is responsible for distributing power from the server's power supply to the various components in the server. In a multi-node enclosure, the primary role for a Power Distribution Board (PDB) is to route input power to HPMs, BMCs (or DC-SCMs), and other devices in the system. The PDB distributes power from a central source such as a busbar to all of the nodes and BMCs (or DC-SCMs) in a multi-node enclosure. The PDB in a multi-node enclosure distributes the input power for each node through a hot-swap-controller (HSC) (such as the Infineon® 710) to enable node specific power telemetry, control, and safety features. The BMC (or DC-SCM) for each node is connected via an Inter-Integrated Circuit (I²C) bus to the HSC, where the HSC is the component that supplies power to the node. Each BMC (or DC-SCM) is connected to the PDB via the I²C bus in order to manage the HSCs for each node, and to enable power control and telemetry features. A BMC (or DC-SCM) can identify the physical location identifier for managed nodes, such as the HPM.

Figure 4:
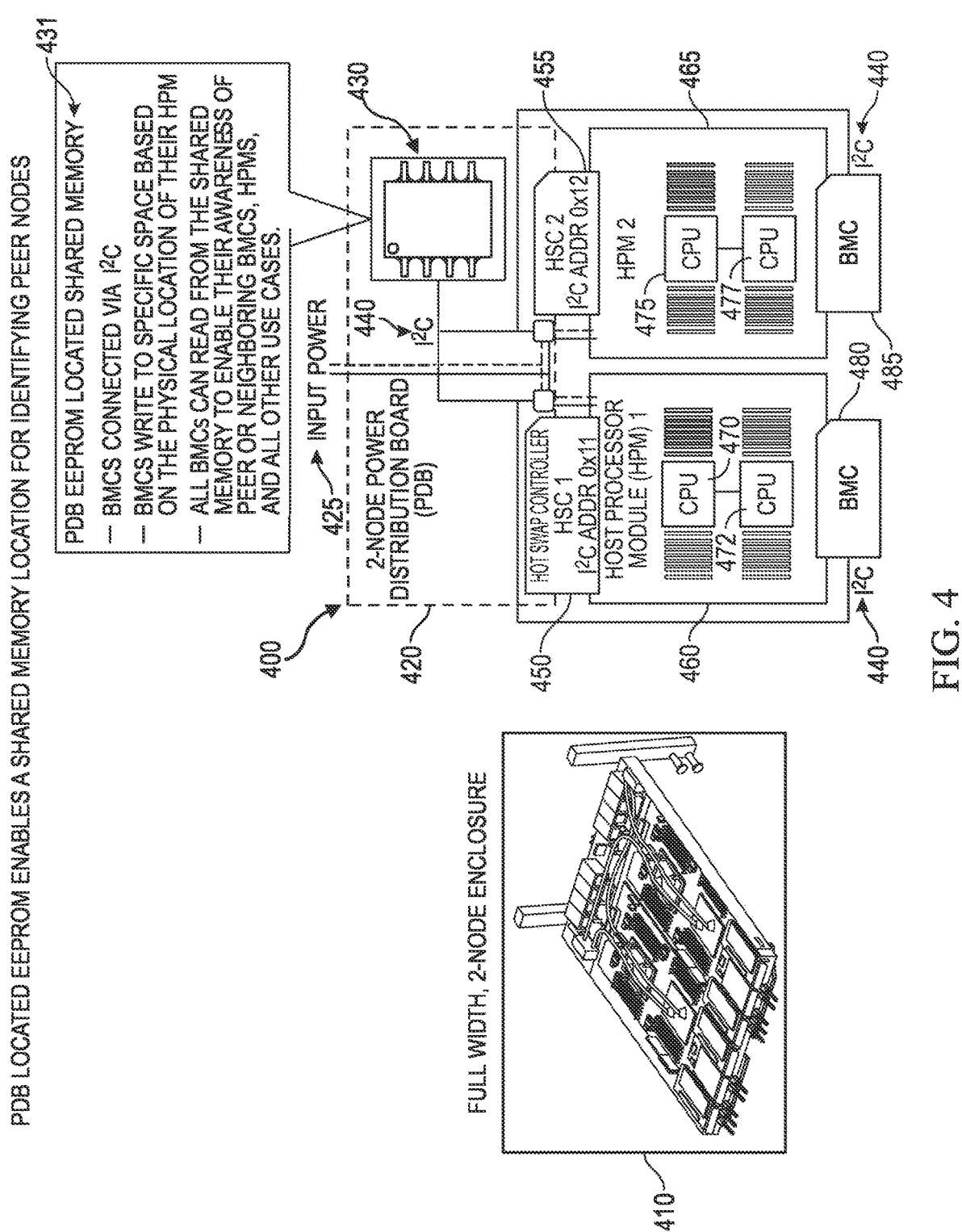
FIG. 4 depicts a Power Distribution Board (PDB) that includes an electrically erasable programmable read-only memory (EEPROM) that enables a shared memory location for identifying peer nodes in a multi-node enclosure, according to some embodiments.

In order to provide an example of the system described above, let's refer first to FIG. 4. FIG. 4 depicts an example multi-node enclosure 400, with two host processor modules (HPMs) 460 and 465. Each HPM acts as its own compute node. Each HPM interfaces with a hot swap controller (HSC) with a different I²C address. HPM 1 (460) interfaces with HSC 1 (450) which has an I²C address of 0×11. HPM 2 (465) interfaces with HSC 2 (455) which has an I²C address of 0×12. Each HPM includes two CPUs. HPM 1 (460) includes CPU 470 and CPU 472. HPM 2 (465) includes CPU 475 and CPU 477. Each HPM also has its own BMC. HPM 1 (460) has BMC 480, while HPM 2 (465) has BMC 485. The multi-node enclosure 400 also includes a 2-node Power Distribution Board (PDB) 420 with input power 425. Each BMC is connected to the PDB via the I²C bus, in order to manage the HSCs for each node, and to enable power control and telemetry features. Therefore, BMC 480 is connected to HSC 1 (450) via I²C bus 440. Similarly, BMC 485 is connected to HSC 2 (455) via I²C bus 440. As shown in FIG. 4, the I²C bus 440 is also connected to EEPROM 430 on the PDB 420, but this will be explained in more detail later.

The workload of all nodes in a multi-node enclosure needs to be managed before service, but there does not exist a method to identify peer nodes in a multi-node enclosure that does not have a traditional Chassis Manager (CM) or Enclosure Controller (EC). The BMCs (or DC-SCMs) for the various nodes are not connected to each other, and there are not any natural mechanisms for one node to be made aware of peer or neighboring nodes. Therefore, some embodiments of the present disclosure have a programmable device (e.g., EEPROM) specifically located on the Power Distribution Board (PDB) of a multi-node enclosure. The EEPROM can have registers programmed by all of the BMCs (or DC-SCMs) in the enclosure. The programmed registers can contain items such as: the physical location of the managed HPMs, an HPM serial number or unique identifier, a model number, and/or Service Tags, etc. These can be read by all BMCs (or DC-SCMs), in some embodiments.

Referring now back to FIG. 2, FIG. 2 depicts a workflow 200 illustrating an example method to identify peer nodes in a multi-node enclosure by a BMC (or DC-SCM), according to some embodiments. In some embodiments, the workflow 200 may be performed, at least in part, by operation of systems through the execution of program instructions stored in system memory 103 and executed by host processor(s) 101 of IHS 100.

As stated previously, some embodiments add a programmable device (e.g., EEPROM) that can store information regarding all the nodes in the multi-node enclosure. The information can be used for service, as well as any or all other purposes, in some embodiments. The EEPROM can be added to the PDB, and connected to each BMC of the multi-node enclosure via the I²C bus, which is already routed to the PDB. This avoids routing an additional bus, or adding complexity to existing cables or HPM routing.

The memory of the EEPROM can then be divided into sections, where each section is reserved for each HPM. For example, HPM [1] can be assigned the $1^{st}$ kB of memory, HPM [2] the $2^{nd}$ kB, . . . and HPM [n] can be assigned the $n^{th}$ kB. The data stored in the EEPROM can include, but is not necessarily limited to: an HPM serial number or other unique identifier, a Service Tag of the HPM or the enclosure, and/or other information to identify the hardware and firmware in the enclosure. In some embodiments, the BMC (or DC-SCM) of each HPM only writes values to the intended sections based on the location of its associated HPM, but it can read all sections of the EEPROM in order to identify peer nodes in a multi-node enclosure.

The workflow of FIG. 2 therefore begins at 210 where a BMC (or DC-SCM) boots, reboots, AC cycles, or performs some other similar procedure. The workflow transitions to block 220 where the BMC detects a Location Identifier in a multi-node enclosure. For example, the BMC can identify the physical location identifier for its managed nodes, such its managed HPM. The flowchart transitions to 230 where the BMC writes node data into the PDB EEPROM at a location specified by the obtained physical location identifier. The node data can be, for example, a service tag of the HPM or the enclosure. For example, HPM [1] can write the $1^{st}$ kB of memory, HPM [2] the $2^{nd}$ kB, . . . and HPM [n] can write the $n^{th}$ kB.

The workflow then transitions to 240 where all BMCs (or DC-SCMs) in the multi-node enclosure will read node identification data in the memory locations written by their peer nodes. The flowchart then transitions to block 250 in which all BMCs store the information about their peer nodes, and make the stored information available for logs and all other use cases. The flowchart then transitions to block 260 in which a periodic discovery and/or retry loop is initiated by all BMCs, in order to identify and keep up with any configuration changes by their peer nodes.

Figure 3:
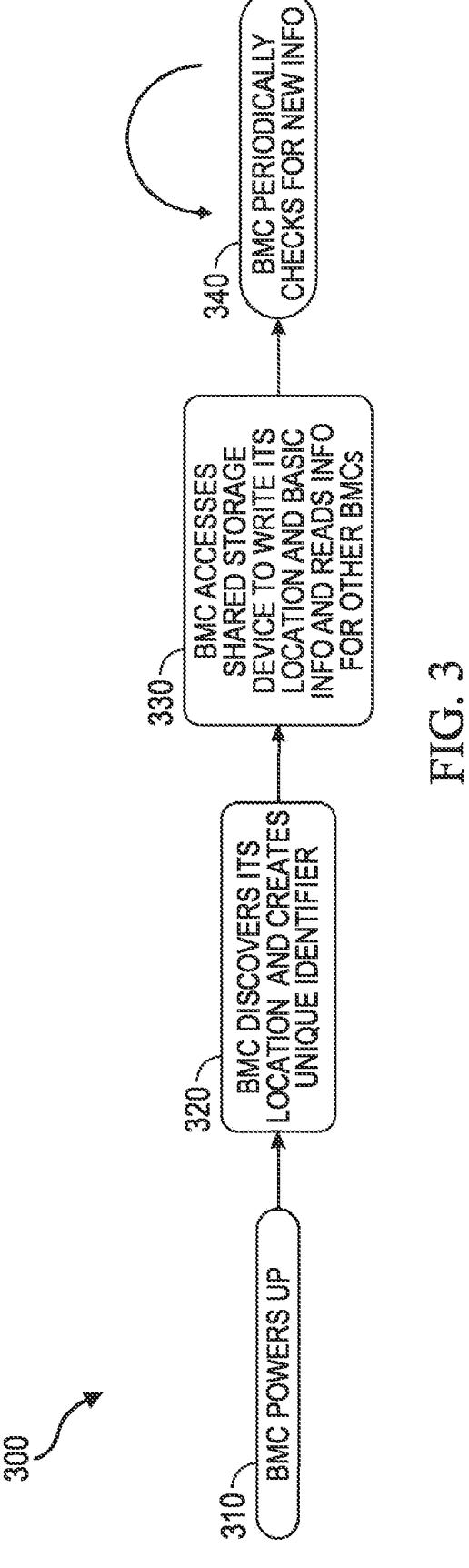
FIG. 3 depicts a flowchart illustrating another example method to identify peer nodes in a multi-node enclosure by a BMC, according to some embodiments.

FIG. 3 depicts a flowchart 300 illustrating another example method to identify peer nodes in a multi-node enclosure by a BMC, according to some embodiments. In some embodiments, the flowchart 300 may be performed, at least in part, by operation of systems through the execution of program instructions stored in system memory 103 and executed by host processor(s) 101 of IHS 100.

FIG. 3 begins at block 310 where the BMC powers up. The flowchart then transitions to block 320 where the BMC discovers its location and creates a unique identifier. The BMC can detect a location identifier in a multi-node enclosure. For example, the BMC can identify the physical location identifier for its managed nodes, such its managed HPM. The flowchart transitions to 330 in the BMC accesses a shared storage device to write its location and basic information. The BMC also reads information for other BMCs. For example, the BMC can write node data into the PDB EEPROM at a location specified by the obtained physical location identifier. The node data can be, for example, a service tag of the HPM or the enclosure. For example, HPM [1] can write the $1^{st}$ kB of memory, HPM [2] the $2^{nd}$ kB, . . . and HPM [n] can write the $n^{th}$ kB. Then all BMCs (or DC-SCMs) in the multi-node enclosure can read node identification data in the memory locations written by their peer nodes. The flowchart then transitions to block 340 where the BMC periodically checks for new information.

FIG. 4 depicts a Power Distribution Board (PDB) that includes an EEPROM that enables a shared memory location for identifying peer nodes in a multi-node enclosure, according to some embodiments. FIG. 4 first discloses a multi-node enclosure 410 in a single rack-mountable equipment module that contains two nodes in the one enclosure. The picture in 410 is an angled top and side perspective view of the full width and depth of a 2-node enclosure mounted to a server rack. showing the full multi-node enclosure and part of the frame of the rack.

FIG. 4 also depicts a more detailed structural diagram of the multi-node enclosure 400, with two host processor modules (HPMs) 460 and 465. Each HPM acts as its own compute node. Each HPM interfaces with a hot swap controller (HSC) with a different I²C address. HPM 1 (460) interfaces with HSC 1 (450) which has an I²C address of 0×11. HPM 2 (465) interfaces with HSC 2 (455) which has an I²C address of 0×12. Each HPM includes two CPUs. HPM 1 (460) includes CPU 470 and CPU 472. HPM 2 (465) includes CPU 475 and CPU 477. Each HPM also has its own BMC. HPM 1 (460) has BMC 480, while HPM 2 (465) has BMC 485. The multi-node enclosure 400 also includes a 2-node Power Distribution Board (PDB) 420 with input power 425. Each BMC is connected to the PDB via the I²C bus, in order to manage the HSCs for each node, and to enable power control and telemetry features. Therefore, BMC 480 is connected to HSC 1 (450) via I²C bus 440. Similarly, BMC 485 is connected to HSC 2 (455) via I²C bus 440.

As shown in FIG. 4, the I²C bus 440 is also connected to EEPROM 430 on the PDB 420. The PDB 420 implements an EEPROM 430 that is connected to the I²C bus 440 of each BMC (480, 485) in the enclosure. The EEPROM 430 is where the shared memory of the multi-node enclosure is located. Each BMC (480, 485) can write to the EEPROM 430 in sections identified by the physical location of the BMC managed HPM, and can also read the shared memory authored by the peer or neighboring BMCs As explained in text box 431, BMCs (480, 485) are connected to the EEPROM 430 via the I²C 440. The BMCs write to a specific space of the EEPROM based on the physical location of their associated HPM (460, 465). All BMCs can read from the shared memory to enable their awareness of peer or neighboring BMCs, HPMs, and all other use cases. The EEPROM is not a micro-controller with firmware.

Therefore, some embodiments of the present disclosure provide a system and method for a PDB mounted logic device, and a data segmentation algorithm, to store configuration data in a multi-node enclosure, such that all BMCs (or DC-SCMs) in the enclosure are aware of peer or neighboring nodes to enable service. Some embodiments can enable each BMC (or DC-SCM) in a multi-node enclosure to identify peer or neighboring nodes, in order to enable use cases for servicing the nodes. A shared data space for peer nodes, as disclosed by the present disclosure, can also enable future innovation as multi-node architecture continues to grow. These embodiments can add value in the form of a shared data space, where the proposed solution does not require an additional firmware release or the overhead and investment inherent with a chassis manager or an enclosure controller.

Figure 6:
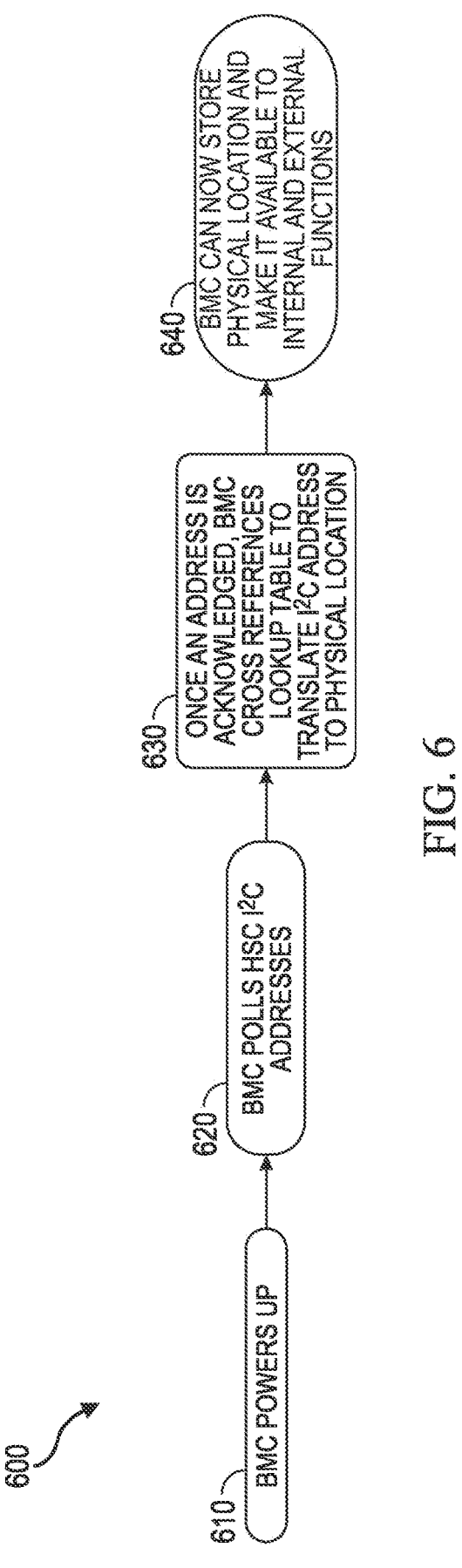
FIG. 6 depicts a flowchart illustrating another example method for the BMC of a node in a multi-node enclosure to identify the physical location of the node, according to some embodiments.
Figure 7:
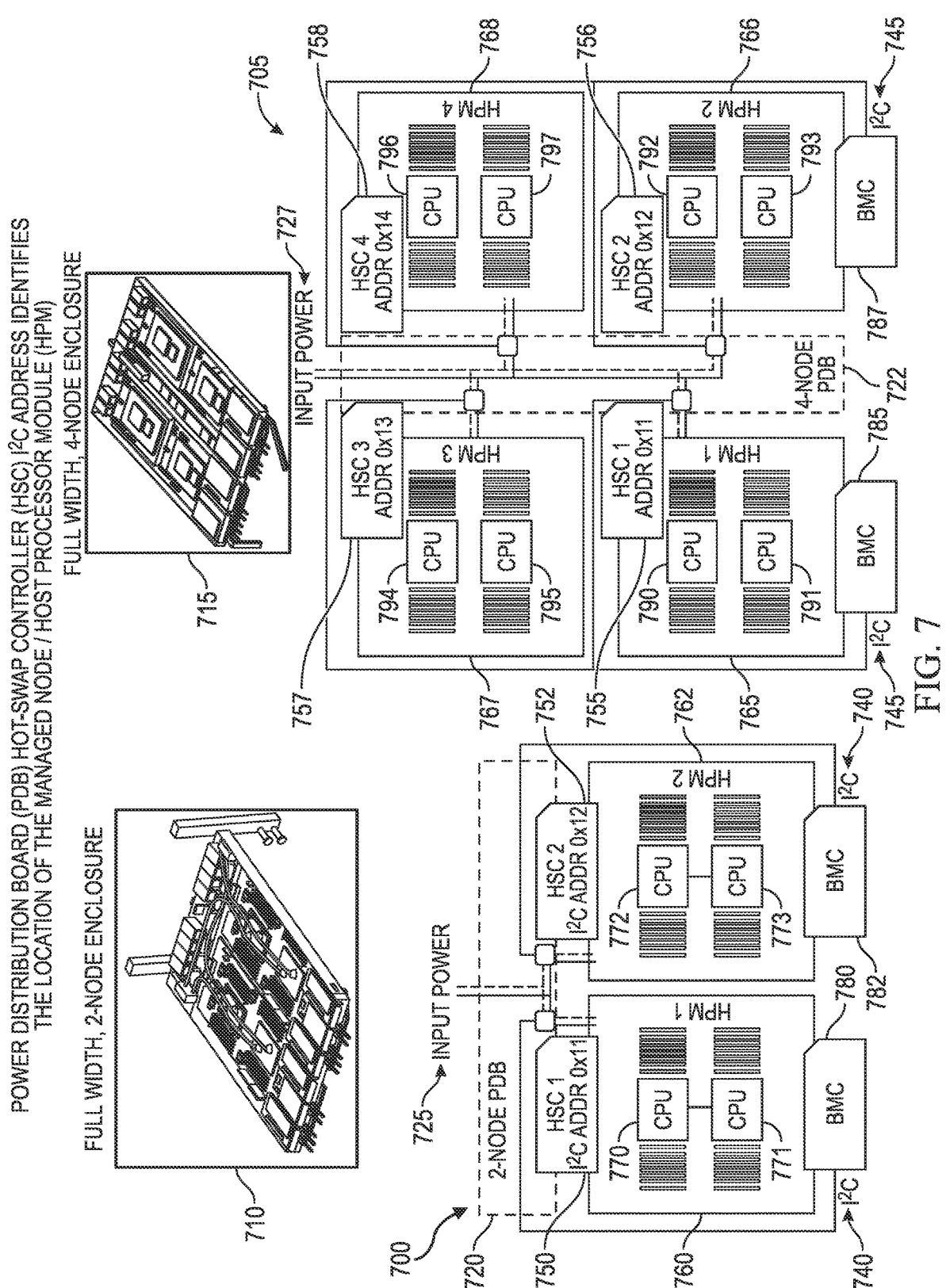
FIG. 7 depicts a PDB that uses the I²C address of each Hot Swap Controller (HSC) to identify the location of a managed node or host processor module (HPM) in a multi-node enclosure, according to some embodiments.

FIGS. 5-7 provide a solution to a slightly different but related problem. In multi-node enclosures, there does not exist an economical method for the BMC (or DC-SCM) of a node in a multi-node enclosure to know the physical location of the node that it is managing. Additional programmable devices could be designed into the node or the Power Distribution Board (PDB) with information to identify the location of a given device, but that would add cost and complexity.

Therefore, in some embodiments of the present disclosure, there is one HSC per node of a PDB, and the strapping resistors for each HSC can be populated such that the I²C address for each HSC is unique. Then, in some embodiments, each BMC (or DC-SCM) in the enclosure can iterate through the series of possible I²C addresses for the HSCs, and can identify the address of an HSC, when it establishes valid communication with the expected device. The BMC (or DC-SCM) can identify the physical location of the managed node/HPM/motherboard by matching the HSC I²C address to a pre-programmed table and/or map of address-to-node physical location identifiers.

More specifically, the I²C address for each HSC on a PDB can be unique based on resistor population options on the address pins of the HSC (e.g., Infineon 710 ADDR0 and ADDR1 pins). For example, referring first to FIG. 7, HSC 1 (750) for HPM 1 (760) can have its I²C address set to 0×11. Similarly, HSC 2 (752) for HPM 1 (762) can have its I²C address set to 0×12. The BMCs (780, 782) can contain a table that maps the HSC I²C address to a physical identifier for the downstream HPM. For example, the BMC 780 managing the node 760 with HSC 1 (750), whose I²C address 0×11, is Managed Node is in Location 1. The BMC 782 managing the node 762 with HSC 2 (752), whose I²C address 0×12, is Managed Node is in Location 2. The BMCs can now identify the physical node location identifier for the node it is managing in a multi-node enclosure without adding any significant cost or complexity to the BMC or PDB.

FIG. 5 depicts a workflow illustrating an example method for the BMC of a node in a multi-node enclosure to identify the physical location of the node, according to some embodiments. In some embodiments, the workflow 500 may be performed, at least in part, by operation of systems through the execution of program instructions stored in system memory 103 and executed by host processor(s) 101 of IHS 100.

The workflow begins at 510 where the BMC boots, reboots, AC cycles, or performs some other similar procedure. The workflow transitions to block 520, where the BMC performs an HSC I²C address discovery. For example, the BMC can try HSC I²C addresses [1 . . . 16]. The workflow transitions to 530, where once connectivity with an HSC confirmed, the BMC can cache the I²C address number. The workflow then transitions to block 540 where the BMC looks-up the HSC I²C address number in an address number to HPM physical location identifier matrix, in BMC. This can be from a Platform Table, in some embodiments. The workflow then transitions to block 550, which saves the HPM physical location identifier. The workflow then transitions to block 560 which makes the HPM physical location identifier available to the BMC functions and subfunctions.

FIG. 6 depicts a flowchart illustrating another example method for the BMC of a node in a multi-node enclosure to identify the physical location of the node, according to some embodiments. In some embodiments, the flowchart 600 may be performed, at least in part, by operation of systems through the execution of program instructions stored in system memory 103 and executed by host processor(s) 101 of IHS 100.

The flowchart begins at 610 where the BMC powers up. The flowchart transitions to bloc 620 where the BMC polls HSC I²C addresses. The flowchart transitions to block 630, where one an I²C address is acknowledged, then the BMC cross-references a lookup table to translate the I²C address to a physical location. The flowchart then transitions to block 640, where the BMC can now store the physical location, and make it available to internal and external functions.

FIG. 7 depicts a PDB that uses the I²C address of each Hot Swap Controller (HSC) to identify the location of a managed node or host processor module (HPM) in a multi-node enclosure, according to some embodiments. The PDB implements Hot Swap Controllers (HSCs) that segment the input power to each managed node or HPM. The I²C address of each HSC enables the BMC to identify the managed node/HPM location in the multi-node enclosure.

FIG. 7 first discloses two multi-node enclosures (710, 715) in a single rack-mountable equipment module. The first multi-node enclosure 710 contains two nodes in the one enclosure. The second multi-node enclosure 715 contains four nodes in the one enclosure. The picture in 710 is an angled top and side perspective view of the full width and depth of a 2-node enclosure mounted to a server rack, showing the full multi-node enclosure and part of the frame of the rack. The picture in 715 is an angled top and side perspective view of the full width and depth of a 4-node enclosure, showing the full width of the multi-node enclosure.

FIG. 7 also depicts more detailed structural diagrams of the two multi-node enclosures (700, 705). The first multi-node enclosure has two host processor modules (HPMs) 760 and 765. The second multi-node enclosure has four host processor modules (HPMs) (765, 766, 767, 768). Each HPM acts as its own compute node. Each HPM interfaces with a hot swap controller (HSC) with a different I²C address. In the two-node enclosure, HPM 1 (760) interfaces with HSC 1 (750) which has an I²C address of 0×11. HPM 2 (762) interfaces with HSC 2 (752) which has an I²C address of 0×12. In the four-node enclosure, HPM 1 (765) interfaces with HSC 1 (755) which has an I²C address of 0×11. HPM 2 (766) interfaces with HSC 2 (756) which has an I²C address of 0×12. HPM 3 (767) interfaces with HSC 3 (757) which has an I²C address of 0×13. HPM 4 (768) interfaces with HSC 4 (758) which has an I²C address of 0×14.

Each HPM includes two CPUs. In the two-node enclosure, HPM 1 (760) includes CPU 770 and CPU 771. HPM 2 (762) includes CPU 772 and CPU 773. In the four-node enclosure, HPM 1 (765) includes CPU 790 and CPU 791. HPM 2 (766) includes CPU 792 and CPU 793. HPM 3 (767) includes CPU 794 and CPU 795. HPM 4 (768) includes CPU 796 and CPU 797.

Each HPM also has its own individual or shared BMC. In the two-node enclosure, HPM 1 (760) has BMC 780, while HPM 2 (762) has BMC 782. In the four-node enclosure, BMC 785 manages HPM 1 (765) and HPM 3 (767), while BMC 787 manages HPM 2 (766) and HPM 4 (768). The two-node enclosure 700 also includes a 2-node Power Distribution Board (PDB) 720 with input power 725. The four-node enclosure 705 includes a 4-node Power Distribution Board 722 with input power 727. Each BMC is connected to the PDB via the I²C bus (740, 745), in order to manage the HSCs for each node, and to enable power control and telemetry features. Therefore, in the two-node enclosure, BMC 780 is connected to HSC 1 (750) via I²C bus 740. Similarly, BMC 782 is connected to HSC 2 (752) via I²C bus 740. In the four-node enclosure, BMC 785 is connected to HSC 1 (755) and HSC 3 (757) via I²C bus 745. Similarly, BMC 787 is connected to HSC 2 (756) and HSC 4 (758) via I²C bus 745.

For each of the BMCs in FIG. 7, the BMC first powers up. Then the BMC performs HSC I²C address discovery, such as trying addresses [1 . . . 16]. Once the BMC has connectivity with an HSC confirmed, it can cache the I²C address number. The BMC can lookup the HSC I²C address number and obtain an HPM physical location identifier. The BMC can store the HPM physical location identifier. Finally, the BMC can make the HPM physical location identifier available to the BMC functions and subfunctions.

Therefore, some embodiments provide a method for a BMC to identify the physical location identifier of a managed node/HPM/Motherboard utilizing a combination of the physical layout of the power distribution board (PDB) in a multi-node enclosure, in conjunction with the unique I²C addresses for each Hot Swap Controller (HSC) on the PDB. Enabling each BMC in a multi-node enclosure to identify the physical location of the managed node(s) in the enclosure is valuable to service such that log messaging, directions to service technicians, and all other physical service use cases have clear direction of what parts in the multi-node enclosure require service.

In other embodiments a DC-SCM I²C bus can be connected to the PDB via a flexible input/output (FIO) gearbox, or directly through the HPM. Either way the I²C can be routed to the PDB. In another embodiment, a DC-SCM managing more than one node can have separate I²C busses routed to each PDB HSC or HPM that it is managing, and the HSC I²C address combined with the I²C bus number can define the physical location identifier.

Figure 8:
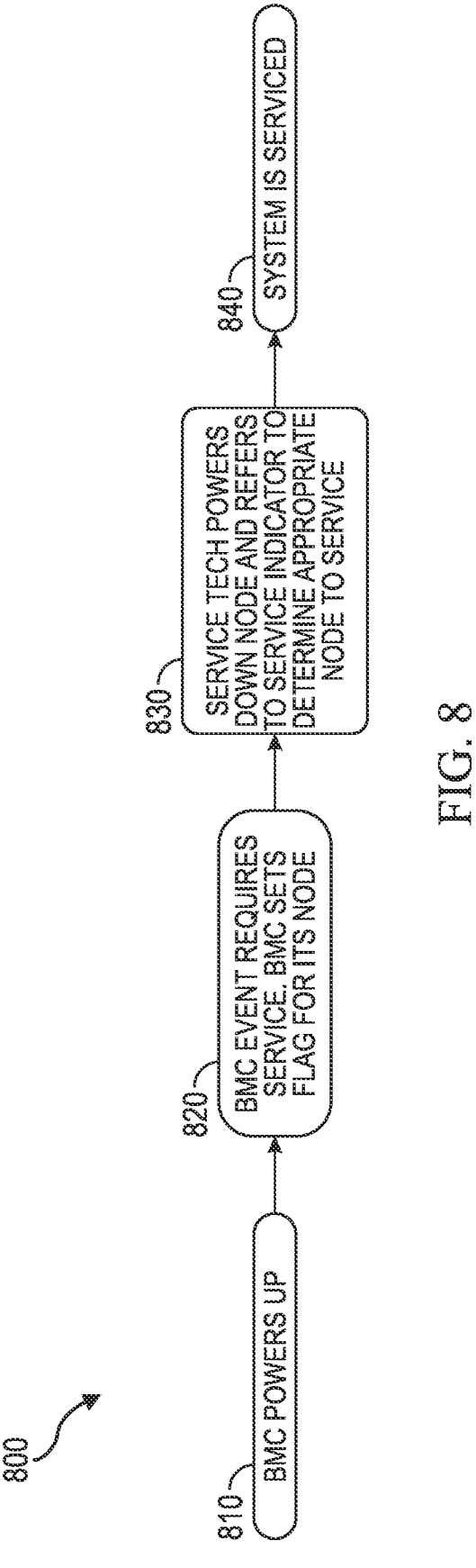
FIG. 8 depicts a flowchart illustrating an example method for a PDB instantiation of a service indicator for a particular node in a multi-node enclosure, according to some embodiments.

FIG. 8 provides a solution to a slightly different but related problem. With multi-node enclosures there is not a natural mechanism for a node to be aware of the physical location of the managed node/HPM/Motherboard in a multi-node enclosure. In addition, there is not a service indicator to instruct a service technician about which parts require service within the enclosure. Existing enclosure and node service indicators are primarily LEDs on single node enclosures that direct technicians to identify and service the correct enclosure. Existing enclosure service indicators may direct the service technician to the correct enclosure, but will not be able to identify the correlating parts requiring service inside the enclosure once the technician has access to the internal payload. For service technicians that are directed to repair or replace a node in a multi-node compute enclosure, they do not have an in-system indicator of what node should be serviced. Such an indicator would prevent service of an incorrect node or part in a multi-node enclosure.

Some embodiments of the present disclosure provide a solution to these problems by having an indicator on the DC-SCM or BMC device, since the DC-SCM or BMC is the entity that will know or otherwise be connected to the devices that require service. Such embodiments can be implemented; however, such embodiments have some disadvantages. First, it is expected that the BMC or DC-SCM could manage multiple components in a multi-node enclosure. Second, the physical board of the BMC or DC-SCM may not be visible with the top cover removed for service. Third, it is also expected that the DC-SCM will have a form factor to be utilized for many different designs and leveraged for multi-node enclosures that have different physical designs.

Therefore, other embodiments of the present disclosure provide a programmable device specifically located on the Power Distribution Board (PDB) of a multi-node enclosure that has a method to physically identify the node location identifier that requires service. The PDB is in a unique position to implement the solution in an efficient and capable way. For example, when a technician removes the top cover of a multi-node enclosure after removing it from the rack, the service indicator programmed by the managing BMC for that node can then identify that the node with location identifier B.2 requires service.

More specifically, there is an I²C connection between the BMC and PDB for each managed node. An "indicator" solution can be present on the PDB for each managed node that can direct a person to know the physical location identifier of the node(s) or other managed parts in a multi-node enclosure. The BMC for each managed node or device in an enclosure can set the service indicator in the correct position prior to the enclosure being removed from the rack, and from power and cooling infrastructure.

The service indicator can be in a number of different forms, depending on the embodiment. As a first example, the service indicator can be an e-reader cell with the ability to display characters or messages that are non-volatile, and can persist when power is removed. As a second example, the service indicator can be an LED indicator for each location identifier, where the LED indicator can illuminate on demand via a button using energy stored in a battery, capacitor, external battery source, or other energy storage component. As a third example, the service indicator can be an electro-mechanical motor with a physical arm that points to service required yes/no for each location identifier. As a fourth example, the service indicator can be an unpowered RFID reader that is programmed prior to the enclosure losing power.

There are numerous other examples of indicators that are both electrical, mechanical, or a mix of both, and many of the embodiments of this disclosure are independent of the actual indicator used and/or the complexity and/or cost associated with different indicator solutions. These embodiments are intended to utilize an indicator, and are not isolated to one particular type, solution or method of the implemented indicator. Therefore, there are many other examples of a service indicator, and the examples discussed here should not be construed as limiting.

There are a number of reasons why locating a service indicator on PDB is a better location than on a BMC or DC-SCM. First, the PDB is not expected to be user-serviceable like a DC-SCM, which makes the PDB a better location for the service indicator. Second, the DC-SCM is not expected to be visible when the node top cover is removed, but the PDB is expected to be visible. Third, the DC-SCM may be shared across multiple nodes, where the PDB is expected to be connected to all BMCs and HPMs in a multi-node enclosure, and be able to locate a service indicator in a close or otherwise intuitive physical position. Fourth, a DC-SCM will not know the physical location of the managed device inside a multi-node enclosure, but a PDB will know the physical location of managed devices, because it is responsible for providing power to each device, and therefore will naturally have a physical connection to the managed devices. Fifth, the PDB has a lot of natural features that can be leveraged in a unique and novel way for serviceability, which allows it to be the simplest design.

FIG. 8 depicts a flowchart illustrating an example method for a PDB instantiation of a service indicator for a particular node in a multi-node enclosure, according to some embodiments. In some embodiments, the flowchart 800 may be performed, at least in part, by operation of systems through the execution of program instructions stored in system memory 103 and executed by host processor(s) 101 of IHS 100.

The flowchart begins at 810 where a BMC powers up. The flowchart transitions to 820 where a BMC event occurs which requires service for a node. The BMC sets a flag for its node. The flowchart transitions to block 830 where a service technician powers down the node, and then refers to the service indicator to determine the appropriate node to service. The flowchart then transitions to block 840 in which the system is serviced.

Therefore, some embodiments of the present disclosure provide a method for a PDB mounted indicator to enable the BMC of managed devices in a multi-node enclosure to identify the physical location identifier of the managed devices, and to determine if that device requires service or not. A PDB mounted indicator directing services to the correct location of the device that requires service, in a multi-node enclosure, would prevent the servicing of the incorrect product. It also increases the likelihood of a first-time service or repair to be successful.

Other embodiments of the present disclosure provide a microcontroller with non-volatile storage that can drive an LED or 7-segment display. Other embodiments provide an external device plugged into a header on the PDB that provides power, a multi-button (e.g., an intrusion switch and DC-SCM front button) to trigger the indicator.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination of thereof. Such configured devices are physically designed to perform the specified operation(s).

Various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
   a baseboard management controller (BMC) or a Datacenter-Secure Control Module (DC-SCM); and
   a memory coupled to or integrated with the BMC or DC-SCM, wherein the memory comprises program instructions stored thereon that, upon execution by the BMC or DC-SCM, cause the IHS to:
      obtain configuration information associated with a first compute node of a multi-node enclosure;
      identify a location of the first compute node within the multi-node enclosure;
      write the configuration information associated with the first compute node to a memory location of a shared storage device that is accessible to other compute nodes of the multi-node enclosure, wherein the memory location is determined, based, at least in part, on the identified location of the first compute node; and
      obtain other configuration information associated with one or more other compute nodes of the multi-node enclosure from the shared storage device.

2. The IHS of claim 1, wherein each node of the multi-node enclosure writes configuration information to a different memory location of the shared storage device.

3. The IHS of claim 1, wherein to identify the location of the first compute node within the multi-node enclosure, the program instructions further cause the IHS to:
   obtain a bus address of a first hot swap controller (HSC) associated with the first compute node; and
   determine a physical location identifier of the first compute node based, at least in part, on the bus address of the first HSC.

4. The IHS of claim 3, wherein the bus address is an address of an Inter-Integrated Circuit ($I^2C$) bus.

5. The IHS of claim 3, wherein to determine the physical location identifier of the first compute node, the program instructions further cause the IHS to:
   use a pre-programmed table or map to match the bus address of the first HSC to the physical location identifier of the first compute node.

6. The IHS of claim 1, wherein the shared storage device is located on a power distribution board (PDB) of the multi-node enclosure.

7. The IHS of claim 6, wherein the configuration information associated with the first compute node is written to the shared storage device via an Inter-Integrated Circuit ($I^2C$) bus between the PDB and the BMC or DC-SCM.

8. The IHS of claim 6, wherein the PDB further comprises a service indicator component, and wherein the program instructions further cause the IHS to:
   determine that the first compute node requires service;
   identify a location of the first compute node within the multi-node enclosure; and
   provide to the service indicator component of the PDB the location of the first compute node.

9. The IHS of claim 8, wherein the service indicator component comprises at least one of: an e-reader, an LED indicator, an electro-mechanical motor, or an unpowered RFID reader.

10. The IHS of claim 1, wherein the BMC or DC-SCM is associated with the first compute node.

11. The IHS of claim 1, wherein the shared storage device is an electrically erasable programmable read-only memory (EEPROM).

12. The IHS of claim 1, wherein a first host processor module (HPM) comprises the first compute node, and wherein the configuration information comprises at least one of: a physical location of the first HPM, a serial number of the HPM, a serial number of the BMC or DC-SCM, a unique identifier of the HPM, a unique identifier of the BMC or DC-SCM, a model number of the HPM, a model number of the BMC or DC-SCM, a service tag of the HPM, or a service tag of the BMC or DC-SCM.

13. The IHS of claim 1, wherein the program instructions further cause the IHS to:
   periodically access the shared storage device to check for updates to the other configuration information.

14. One or more non-transitory computer-readable storage media storing program instructions that when executed on or across one or more processors of an Information Handling System (IHS), cause the one or more processors to:

obtain configuration information associated with a first compute node of a multi-node enclosure;

identify a location of the first compute node within the multi-node enclosure;

write the configuration information associated with the first compute node to a memory location of a shared storage device that is accessible to other compute nodes of the multi-node enclosure, wherein the memory location is determined, based at least in part, on the identified location of the first compute node; and obtain other configuration information associated with one or more other compute nodes of the multi-node enclosure from the shared storage device.

15. The one or more non-transitory computer-readable storage media of claim 14, wherein to identify the location of the first compute node within a multi-node enclosure, the program instructions further cause the one or more processors to:

obtain a bus address of a first hot swap controller (HSC) associated with the first compute node; and determine a physical location identifier of the first compute node based, at least in part, on the bus address of the first HSC.

16. A method, comprising:

obtaining, by a baseboard management controller (BMC) or a Datacenter-Secure Control Module (DC-SCM) of a first compute node of a multi-node enclosure, configuration information associated with the first compute node;

identifying, by the BMC or DC-SCM, a location of the first compute node within the multi-node enclosure;

writing, by the BMC or DC-SCM, the configuration information associated with the first compute node to a memory location of a shared storage device that is accessible to other compute nodes of the multi-node enclosure, wherein the memory location is determined based at least in part on the identified location of the first compute node; and obtaining, by the BMC or DC-SCM, other configuration information associated with one or more other compute nodes of the multi-node enclosure from the shared storage device.

17. The method of claim 16, wherein identifying the location of the first compute node within the multi-node enclosure further comprises:

obtaining, by the BMC or DC-SCM, a bus address of a first hot swap controller (HSC) associated with the first compute node; and determining, by the BMC or DC-SCM, a physical location identifier of the first compute node based, at least in part, on the bus address of the first HSC.

* * * * *